United States Patent
Kolasa

(10) Patent No.: US 9,396,716 B2
(45) Date of Patent: Jul. 19, 2016

(54) WHISTLE ASSEMBLY

(71) Applicant: ILLINOIS TOOL WORKS INC., Glenview, IL (US)

(72) Inventor: Scott D. Kolasa, Mt. Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/652,809

(22) PCT Filed: Nov. 20, 2013

(86) PCT No.: PCT/US2013/070924
§ 371 (c)(1),
(2) Date: Jun. 17, 2015

(87) PCT Pub. No.: WO2014/099225
PCT Pub. Date: Jun. 26, 2014

(65) Prior Publication Data
US 2015/0325227 A1    Nov. 12, 2015

Related U.S. Application Data

(60) Provisional application No. 61/739,052, filed on Dec. 19, 2012.

(51) Int. Cl.
*A63H 5/00* (2006.01)
*G10K 5/00* (2006.01)
*F16G 11/10* (2006.01)

(52) U.S. Cl.
CPC ............... *G10K 5/00* (2013.01); *F16G 11/101* (2013.01)

(58) Field of Classification Search
USPC ........ 446/202, 204, 205, 213, 216; 24/163 R, 24/168, 604, 614
See application file for complete search history.

(56) References Cited

U.S. PATENT DOCUMENTS

| | | | | |
|---|---|---|---|---|
| 5,671,505 A * | 9/1997 | Anscher | ............... | F16G 11/10 24/115 G |
| 6,024,594 A * | 2/2000 | Self, Jr. | ............ | H01R 13/6273 439/358 |
| 6,058,578 A * | 5/2000 | Lan | ................. | A44B 19/262 24/115 G |
| 6,109,490 A * | 8/2000 | Caluori | ............. | A44C 5/0007 2/160 |
| 6,416,379 B1 * | 7/2002 | Topman | ................ | G10K 5/00 24/302 |
| 6,668,428 B2 * | 12/2003 | Moeller | ............ | A44B 11/001 24/163 R |
| 6,986,535 B2 * | 1/2006 | Kawamoto | .......... | E05C 19/022 200/524 |
| 7,043,802 B2 * | 5/2006 | Moeller | .......... | A44B 19/262 24/429 |
| 7,546,667 B2 * | 6/2009 | Yang | .................. | A44B 11/006 24/134 R |
| 8,069,810 B2 * | 12/2011 | Petzl | ................... | F16G 11/10 116/137 R |
| 8,220,677 B2 * | 7/2012 | Liang | ................... | A45F 5/02 224/254 |
| 8,973,956 B2 * | 3/2015 | Sambommatsu | ..... | E05C 19/022 292/341.15 |
| 2004/0148745 A1 * | 8/2004 | Moeller | ............ | A44B 19/262 24/429 |

FOREIGN PATENT DOCUMENTS

CZ        9004754 A3    3/1996

OTHER PUBLICATIONS

ISR and WO for PCT/US2013/070924 mailed Feb. 21, 2014.

* cited by examiner

*Primary Examiner* — Kurt Fernstrom

(57) ABSTRACT

A whistle assembly may include a main body, a cord insert, and a cord. The main body may include a mouth-receiving end connected to a cord end. A channel may be formed through at least a portion of the cord end. The cord insert may include a housing having a cord passage. The cord insert is retained within the channel of the main body. The cord has an end that is securely retained within the cord passage of the cord insert that is within the channel of the main body.

13 Claims, 6 Drawing Sheets

WHISTLE ASSEMBLY

RELATED APPLICATIONS

This application is a National Phase of International Application Number PCT/US2013/070924 filed Nov. 20, 2013 and relates to and claims priority benefits from U.S. Provisional Patent Application No. 61/739,052 filed Dec. 19, 2012, which is hereby incorporated by reference in its entirety.

FIELD OF EMBODIMENTS OF THE DISCLOSURE

Embodiments of the present disclosure generally relate to a whistle assembly, and more particularly, to a whistle assembly having a cord insert that is configured to securely lock into a main body and a cord.

BACKGROUND

Whistles are used by many individuals, such as policemen, sporting event referees, coaches, physical education teachers, and the like. Many whistles include a cord or strap that is configured to allow the whistle to be worn around a neck of an individual. Typically, a cord connected to a whistle connects to a structure extending from an outer surface of the whistle body, or to additional structure that connects to the outer surface the whistle. In one example, a cord may be secured to a large collar that slides over an outer surface of a whistle body. The cord may be secured to a relatively large, bulky structure, such as a collar that snaps over a whistle body.

At least some known whistles may become disconnected from a cord or strap if sufficient force is exerted into the cord or strap. Often, the cord or strap is positioned with respect to a structure that does not provide sufficient retaining force. As such, the cord or strap may be unintentionally removed from the whistle.

Accordingly, known relatively large, bulky whistles may prove to be awkward to handle and store. For example, known whistles may be so bulky as to be difficult to fit within a pocket and/or easily detectable while within a pocket. Further, known whistles may be unintentionally removed from cords or straps with relatively small amounts of force.

SUMMARY OF EMBODIMENTS OF THE DISCLOSURE

Embodiments of the present disclosure provide a compact whistle assembly having a cord secured thereto.

Certain embodiments of the present disclosure provide a whistle assembly that may include a main body and a cord insert configured to be inserted into the main body. The main body may include a mouth-receiving end connected to a cord end. A channel may be formed through at least a portion of the cord end. The cord insert is configured to retain a cord within a cord passage that extends within the cord insert. The cord insert is configured to be retained within the channel of the main body. A portion of the cord is configured to be securely retained within the cord passage of the cord insert that is within the channel of the main body.

The cord insert may include opposed cord-lock members that are configured to securely clamp to the portion of the cord within the cord passage when the cord insert is retained within the channel of the main body. At least outer portions of the cord-lock members may be configured to securely connect the cord insert to interior surfaces of the main body that define at least a portion of the channel. Each of the cord-lock members may include a flexible root connected to a locking stud that is configured to engage the portion of the cord. The locking stud may include one or more cord-engagers.

The cord insert may include one or more locking protuberances extending outwardly therefrom. The locking protuberance(s) may be configured to securely connect the cord insert to interior surfaces of the main body that define at least a portion of the channel.

The cord insert further may include one or more sealing members configured to sealingly engage interior surfaces of the main body.

The mouth-receiving end of the main body may include a blow hole connected to a whistle hole through a whistle passage.

Certain embodiments of the present disclosure provide a whistle assembly that may include a main body, a cord insert, and a cord. The main body may include a mouth-receiving end connected to a cord end. A channel may be formed through at least a portion of the cord end. The cord insert may include a housing having a cord passage. The cord insert may be retained within the channel of the main body. The cord has an end that is securely retained within the cord passage of the cord insert that is within the channel of the main body.

Figure 1:
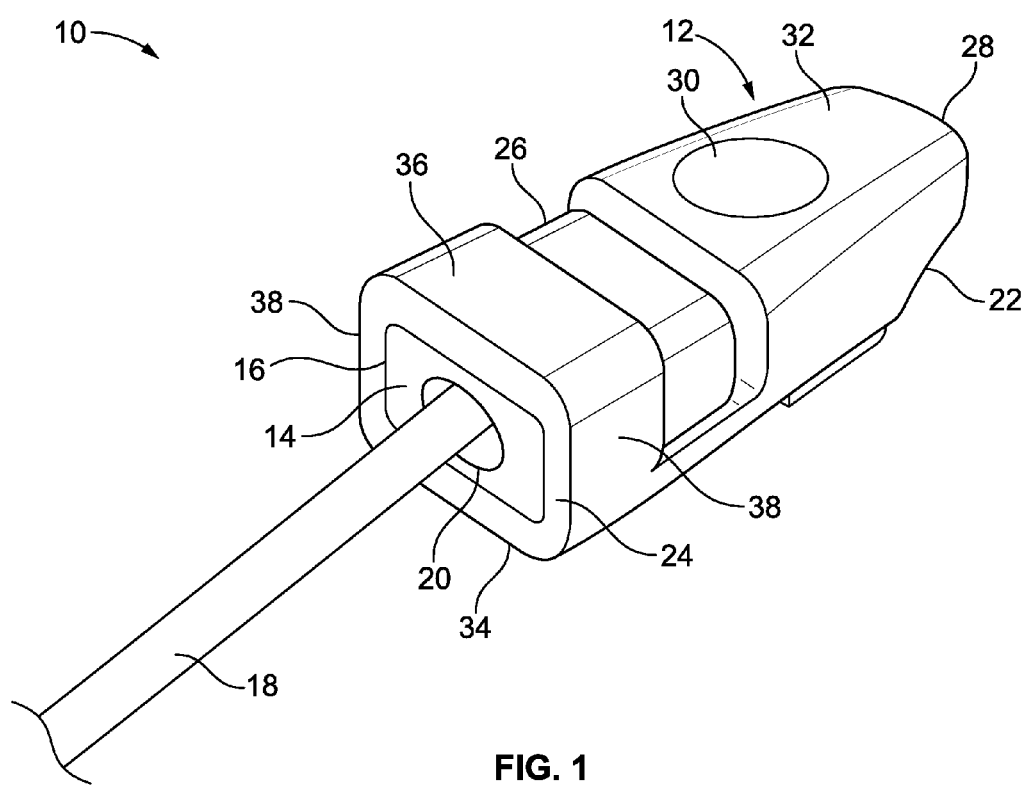
FIG. 1 illustrates a top perspective view of a whistle assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a top perspective view of a whistle assembly 10, according to an embodiment of the present disclosure. The whistle assembly 10 includes a main body 12 that receives and retains a cord insert 14 within a channel 16. A cord 18 is securely retained within a cord passage 20 that extends within the cord insert 14. As shown, the cord insert 14 is retained within the main body 12, as opposed to being secured around an outer surface of the main body 12.

The main body 12 may be integrally molded and formed as a single piece of plastic or metal, for example. The main body 12 includes a mouth-receiving end 22 connected to a cord end 24 by an intermediate section 26. Alternatively, the mouth-receiving end 22 may be directly connected to the cord end 24 without the intermediate section 26. The mouth-receiving end 22 may be tapered, as shown, and includes a blow hole (not shown in FIG. 1) formed through a distal tip 28 and a whistle hole 30 formed through a top surface 32. In operation, a user engages the distal tip 28 with his/her mouth and blows through the blow hole. The exhaled air through the blow hole exits the whistle hole 30 and produces a whistling sound or tone.

The cord end 24 includes a bottom wall 34 integrally connected to a top wall 36 through lateral walls 38. The bottom and top walls 34 and 36, respectively, may be parallel with one another and perpendicular to the lateral walls 38. The walls 34, 36, and 38 define the channel 16 formed through the main body 12 into which the cord insert 14 is retained. The cord end 24 may be sized and shaped differently than shown, depending on the size and shape of the cord insert 14.

Figure 2:
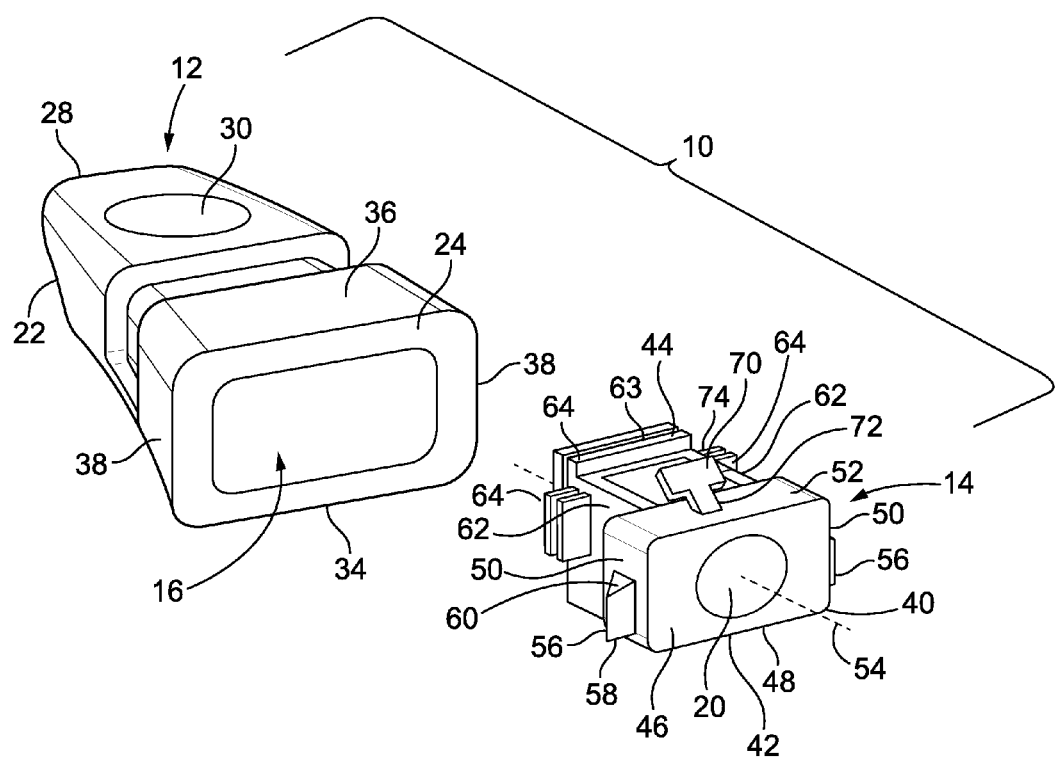
FIG. 2 illustrates a top perspective exploded view of a whistle assembly, according to an embodiment of the present disclosure.

FIG. 2 illustrates a top perspective exploded view of the whistle assembly 10, according to an embodiment of the present disclosure. The cord insert 14 may be integrally formed and molded as a single piece of plastic or metal, for example. The cord insert 14 includes a housing 40 having a cord-reception end 42 integrally connected to a body-insertion end 44.

The cord-reception end 42 includes a planar face 46 connected to a bottom wall 48, lateral walls 50, and a top wall 52. The planar face 46 may connect to front edges or portions of each of the walls 48, 50, and 52, and may be perpendicular thereto. The cord passage 20 is formed through the planar face 46. For example, the cord passage 20 may be circular in cross-section and may be generally centered about a longitudinal axis 54 of the cord insert 14. Alternatively, the cord passage 20 may not be centered about the longitudinal axis 54.

Figure 4:
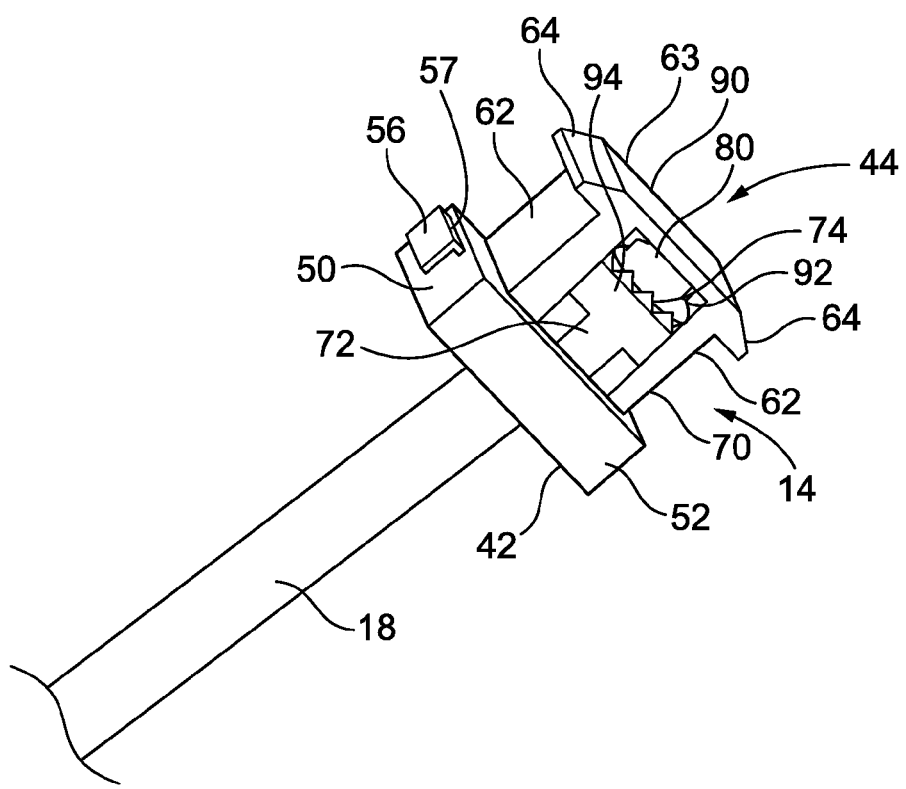
FIG. 4 illustrates a top perspective view of a end of a cord inserted into a cord insert, according to an embodiment of the present disclosure.

Locking protuberances 56 may extend outwardly from the lateral walls 50. The locking protuberances 56 may include flexible beams, ramps, teeth, barbs, clasps, or the like that are configured to securely lock the cord insert 14 into the channel 16 of the main body 12, such as through a friction fit and/or snap connection. Each locking protuberance 56 may include a locking beam 58 proximate to the planar face 46 that connects to a ramped surface 60 that tapers down toward the body-insertion end 44. The locking beam 58 may or may not directly connect to the lateral wall 50. For example, the locking beam 58 may be a flexible beam that connects to an extension beam 57 (as shown in FIG. 4, for example). While the cord insert 14 is shown with a locking protuberance 56 on each lateral wall 50, more or less locking protuberances 56 may be used. For example, each lateral wall 50 may include two or more locking protuberances 56. Further, locking protuberances 56 may be formed on the bottom and top walls 48 and 52, respectively.

The body-insertion end 44 includes lateral walls 62 that extend from a distal end 63 to the cord-reception end 42. Sealing members 64 may extend outwardly from lateral, upper and bottom portions of the distal end 63. The sealing members 64 may be flexible beams, tabs, straps, flaps, or the like that are configured to sealingly engage interior wall portions of the main body 12 that define the channel 16.

Opposed cord-lock members 70 extend from the top wall 52 and the bottom wall 48 of the cord-reception end 42. The bottom cord-lock member 70 is hidden from view in FIG. 2. Each cord-lock member 70 includes a flexible root 72 that extends from the top or bottom wall 52 or 48, respectively. A locking stud 74 extends from a distal end of the flexible root 72.

Figure 3:
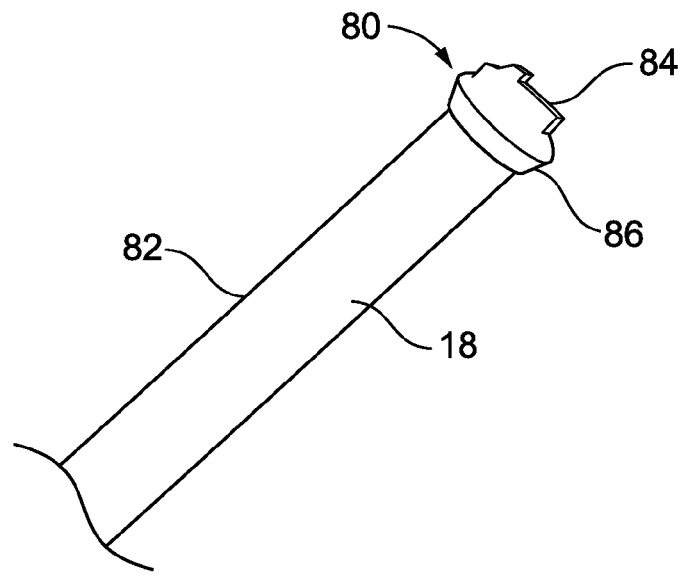
FIG. 3 illustrates a top perspective view of an end of a cord, according to an embodiment of the present disclosure.

FIG. 3 illustrates a top perspective view of an end 80 of the cord 18, according to an embodiment of the present disclosure. The cord 18 may include a flexible body 82. The end 80 may include a cap 84 having a circumferential ridge 86. The end 80 may have a diameter that is greater than that of the flexible body 82. Alternatively, the cord 18 may not include the cap 84. Instead, the flexible body 82 and the end 80 thereof may have the same diameter. Also, alternatively, instead of the cap 84, the end 80 may include a melt cut end, which may be formed through the use of a hot knife cutter that cuts the webbing and cord to produce a clean cut with no fraying.

FIG. 4 illustrates a top perspective view of the end 80 of the cord 18 inserted into the cord insert 14, according to an embodiment of the present disclosure. Referring to FIGS. 2-4, the end 80 of the cord 18 is inserted into the cord passage 20 and urged therein. The cord 18 is prevented from passing through the distal end 63 of the body-insertion end 44 by a rear wall 90.

As the end 80 is inserted into the cord passage 20, the locking studs 74 of the opposed cord-lock members 70 may flex outwardly about the connection between the flexible roots 72 and the top and bottom walls 52 and 48, respectively. The locking studs 74 are able to flex in and out of spaces 92 formed through upper and lower portions of the body-insertion end 44.

The locking studs 74 may include a plurality of cord-engagers 94, such as teeth, ridges, edges, or the like, that may be configured to dig into the cord 18. The cord-engagers 94 may positively secure to the circumferential ridge 86 of the end 80 of the cord 18, for example. As shown, the cord 18 is configured to be securely retained by the cord-lock members 70 within the cord insert 14, in contrast to a hook or hoop that extends outwardly from the main body 12 (shown in FIG. 1) or the cord insert 14.

More or less cord-lock members 70 may be used. For example, cord-lock members 70 may extend from lateral walls 50.

Figure 5:
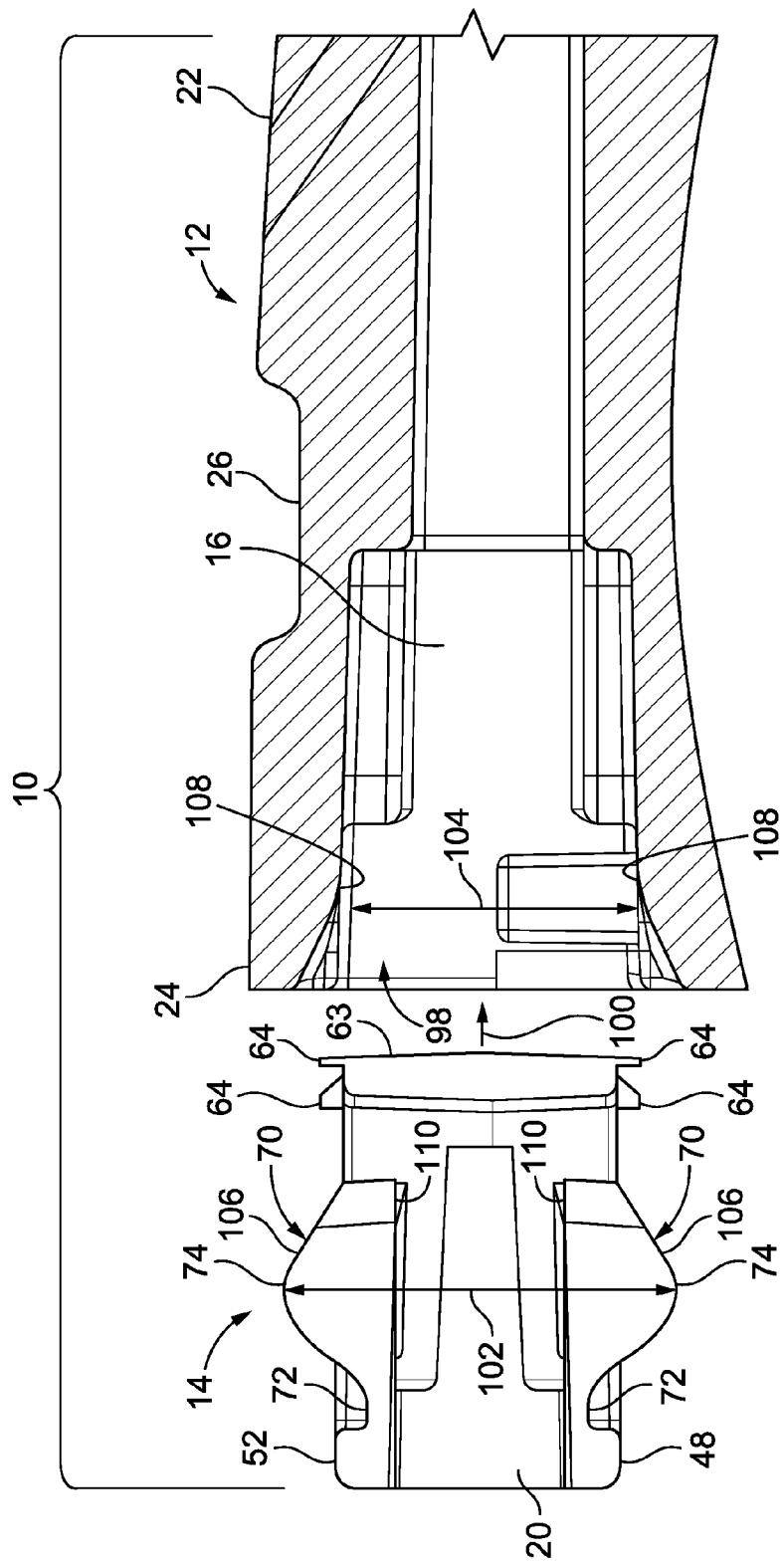
FIG. 5 illustrates a longitudinal cross-sectional view of a cord insert removed from a main body of a whistle assembly, according to an embodiment of the present disclosure.

FIG. 5 illustrates a longitudinal cross-sectional view of the cord insert 14 removed from the main body 12 of the whistle assembly 10, according to an embodiment of the present disclosure. In order to securely connect the cord insert 14 to the main body 12, the distal end 63 of the cord insert 14 is positioned proximate to and aligned with an entrance 98 of the channel 16. The cord insert 14 is then urged into the channel 16 in the direction of arrow 100.

As shown in FIG. 5, the span 102 between outer surfaces 106 of the opposed locking studs 74 (in at-rest positions) is greater than the span 104 of the channel 16. As the cord insert 14 is inserted into the channel 16, the outer surfaces 106, which may be smooth and curved, of the locking studs 74 slide beneath or over internal surfaces 108 that define the channel 16. With increased urging in the direction of arrow 100, the internal surfaces 108 force the locking studs 74 to deflect inwardly about the flexible roots 72, so that distal tips 110 of the locking studs 74 deflect toward one another.

Figure 6:
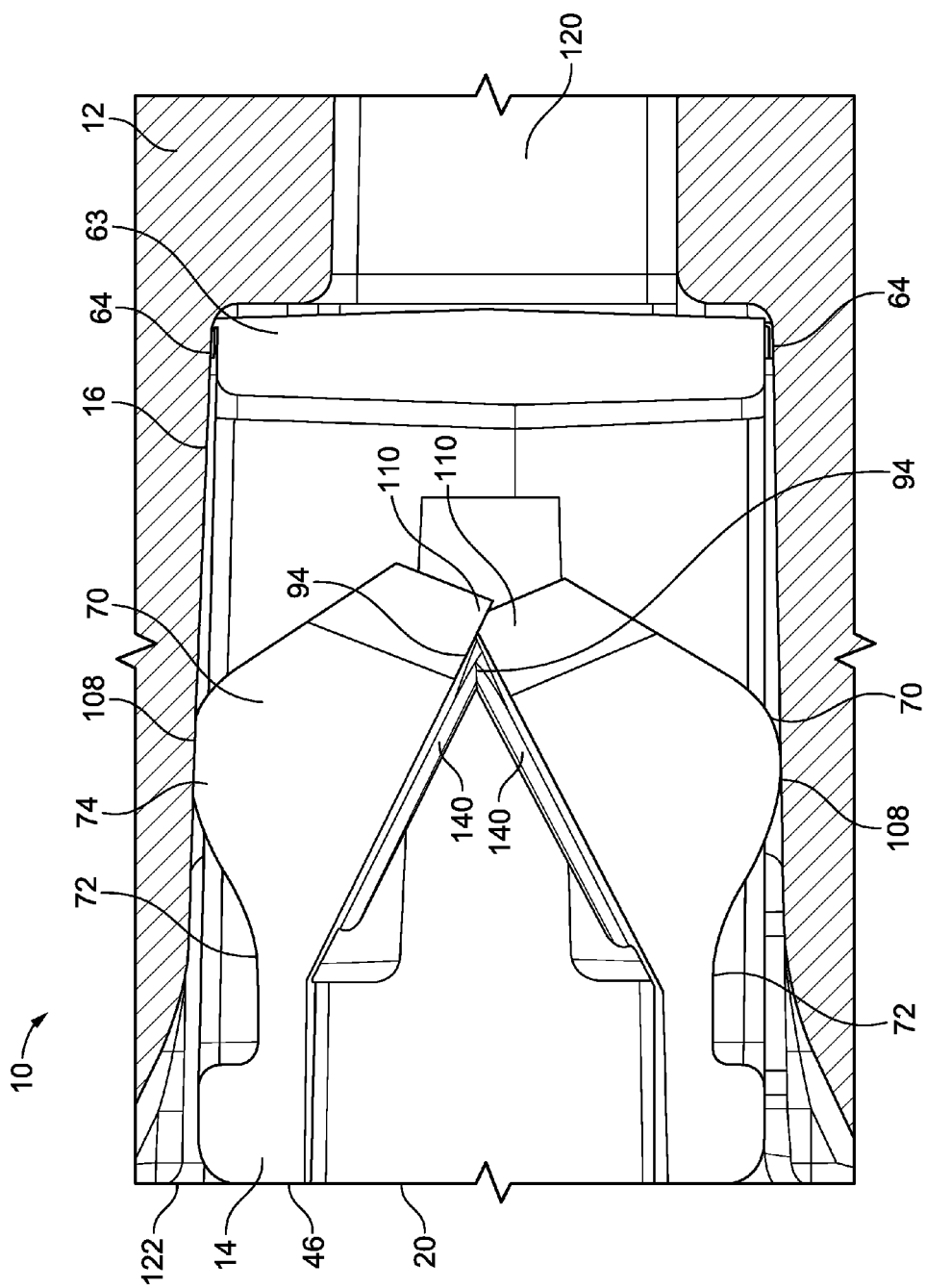
FIG. 6 illustrates a longitudinal cross-sectional view of a cord insert securely positioned within a main body of a whistle assembly, according to an embodiment of the present disclosure.

FIG. 6 illustrates a longitudinal cross-sectional view of the cord insert 14 securely positioned within the main body 12 of the whistle assembly 10, according to an embodiment of the present disclosure. Notably, the cord insert 14 is securely retained within the main body 12, in contrast to being secured over an outer surface of the main body 12.

In the fully-connected position, the locking studs 74 are forced towards one another, such that their respective distal tips 110 may converge toward and/or connect with one another. As such, a cord (not shown in FIG. 6), positioned therebetween is securely trapped between the opposed locking studs 74. The cord-engagers 94 may dig into the material of the cord, thereby providing a stronger retaining force. Alternatively, the locking studs 74 may not include the cord-engagers 94.

Referring to FIGS. 1, 2, 4, and 6, the locking protuberances 56 (hidden from view in FIGS. 1 and 6) may engage features within the main body 12 to securely connect the cord insert 14 to the main body 12. The locking protuberances 56 may be outwardly biased. When the cord insert 14 is moved into the main body 12, interior surfaces 108 of the main body 12 push the locking protuberances 56 inwardly toward their respective lateral walls 50. At the same time, the locking protuberances 56 naturally push out against the interior walls 108 of the main body 12 due to their biased nature. The locking protuberances 56 and the interior walls 108 may securely connect together through friction, for example. Alternatively, the locking protuberances 56 may securely connect to reciprocal features formed within the interior walls 108. For example, the locking protuberances 56 may snapably or latchably secure to reciprocal features formed within the interior walls 108.

The locking protuberances 56 ensure that the cord insert 14 is properly aligned with and securely connected to the main body 12. As such, the cord-lock members 70 may securely lock into the cord 18 and bias against the interior walls 108 of the main body 12, while the locking protuberances 56 laterally lock the cord insert 14 inside the main body 12 so that the cord insert 14 is prevented from rotating within the main body 12.

As shown in FIG. 6, in particular, in the fully-connected position, the planar face 46 of the cord insert 14 may be flush with outer edges 122 of the main body 12 that define the entrance 98 of the channel 16. Further, the sealing members 64 are bent back and provide a fluid-tight seal between the distal end 63 of the cord insert 14 and the internal surfaces 108 that define a portion of the channel 16. As such, the sealing members 64 prevent liquid and/or air from passing between a whistle passage 120 of the main body 12 and the cord insert 14. The sealing members 64 create an air-tight connection with the channel 16 of the main body 12. Once sealed, the whistle assembly 10 is configured to produce a tone when an individual blows into the blow hole of the whistle assembly 10.

An air-tight seal may be formed by the sealing members 64 closing off the open end of the whistle passage 120 within the main body 12. The sealing members 64 may be flexible and resilient fins, flashing, ribs, rims, ridges, or the like that sealingly engage portions of the interior surfaces 108 of the main body 12. The sealing members 64 may bend and/or wedge into the interior surfaces 108 in order to provide the air-tight seal. The sealing members 64 are configured to accommodate various tolerances during the manufacturing process. The sealing members 64 conform to the interior surfaces 108 of the main body 12 to form a seal without reducing interior chamber size.

Figure 7:
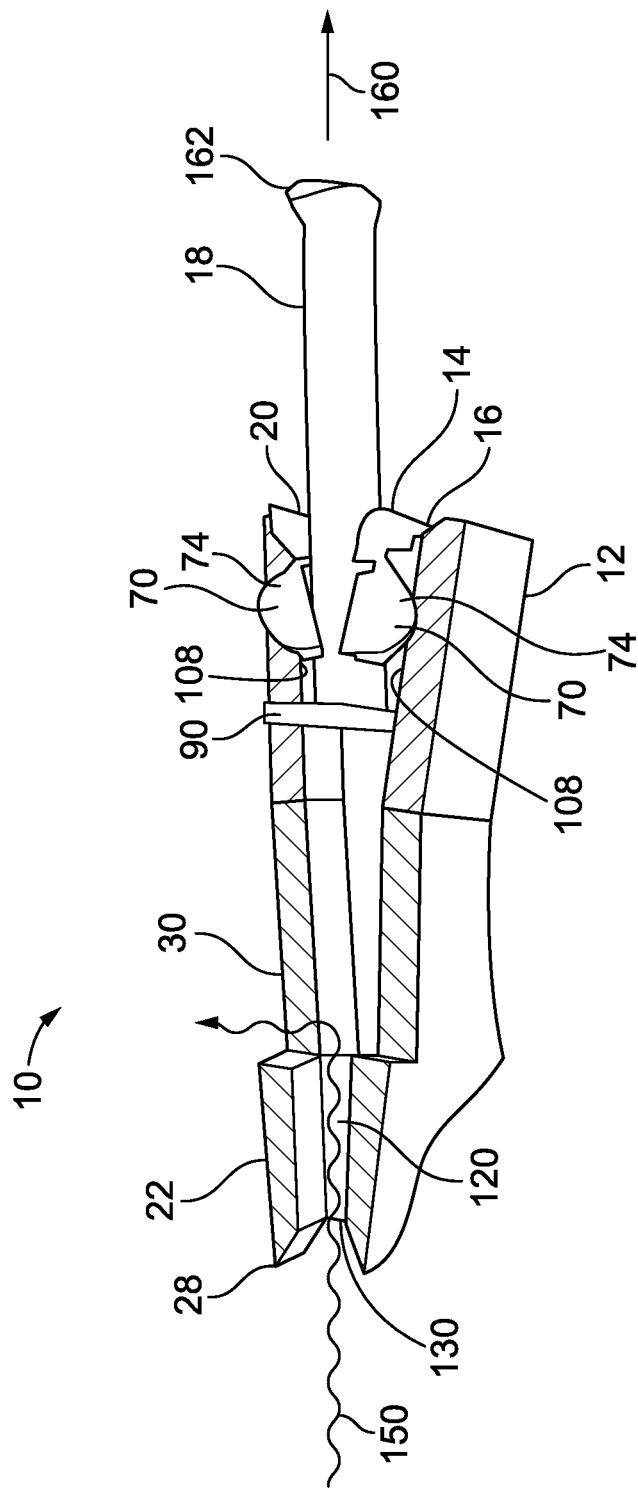
FIG. 7 illustrates a longitudinal cross-sectional view of a fully-assembled whistle assembly, according to an embodiment of the present disclosure.

FIG. 7 illustrates a longitudinal cross-sectional view of a fully-assembled whistle assembly 10, according to an embodiment of the present disclosure. The cord 18 is securely connected to the cord insert 14 within the channel 16 of the main body 12. As such, the cord 18 is securely connected to the cord insert 14 inside of the main body 12, in contrast to an outer portion of the whistle assembly 10. The opposed cord-lock members 70 are deflected into the cord 18 and securely retain the cord 18 therebetween. The opposed cord-lock members 70 clamp onto the cord 18 due to the internal surfaces 108 of the main body 12 biasing the locking studs 74 into the cord 18. As such, the opposed cord-lock members 70 exert a retaining force into the cord 18 that prevents the cord 18 from retreating through the cord passage 20 in the direction of arrow 160.

As shown in FIG. 7, the cord-lock members 70 are inwardly-biased toward one another, thereby providing a firmer grip on the cord 18. The locking studs 74 of the cord-lock members 70 push back against the internal surfaces 108 of the main body 12, thereby providing increased retaining force between the cord insert 14 and the main body 12. The opposed locking studs 74 may retain the cord 18 with increased force due to the cord-engagers 94 (shown in FIG. 6). For example, the cord-engagers 94 may include portions 140 (shown in FIG. 6), such as ledges, ridges, ribs, or the like. The opposed locking studs 74 may be configured to create a wedge type configuration similar to novelty finger cuffs. As such, as a force is exerted into an end 162 of the cord 18 in the direction of arrow 160, the cord-engagers 94 exert a tighter grip on the cord 18.

As the cord 18, which is trapped between the opposed locking studs 74, is pulled in the direction of arrow 160, the opposed locking studs 74 may move in response thereto. As the opposed locking studs 74 move in response to the pulling direction of arrow 160, the opposed locking studs squeeze together tighter, thereby providing an increased retaining force with respect to the cord 18.

The cord insert 14 locks into the channel 16 of the main body 12, while also locking onto the cord 18. As the cord 18 is pulled in the direction of arrow 160, the cord-lock members 70 exert greater locking force into the cord 18, thereby increasing the retaining strength and preventing the cord 18 from being removed.

As also shown in FIG. 7, the main body 12 includes a blow hole 130 at the distal tip 28. The blow hole 130 connects to the whistle hole 30 through the whistle passage 120. As exhaled breath 150 is blown through the blow hole 130 and travels through the whistle hole 30 via the whistle passage 120, a whistling sound or tone is generated.

Embodiments of the present disclosure provide a compact whistle assembly that is easy to handle and store. Embodiments of the present disclosure allow for a single cord/webbing and/or multiple cords/webbing to be secured to the whistle assembly 10.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A whistle assembly comprising:
a main body including a mouth-receiving end connected to a cord end, wherein the mouth-receiving end includes a blow hole connected to a whistle hole through a whistle passage, wherein a channel is formed through at least a portion of the cord end; and
a cord insert configured to retain a cord within a cord passage that extends within the cord insert, wherein the cord insert is configured to be retained within the channel of the main body, and wherein a portion of the cord is configured to be securely retained within the cord passage of the cord insert that is within the channel of the main body, wherein the cord insert comprises opposed cord-lock members that are configured to securely clamp to the portion of the cord within the cord passage when the cord insert is retained within the channel of the main body, wherein each of the cord-lock members comprises a flexible root connected to a locking stud that is configured to engage the portion of the cord, wherein the locking stud inwardly flexes about the flexible root, wherein the locking stud is configured to inwardly deflect about the flexible root as the cord insert is inserted into the channel of the main body, and wherein the locking studs of the opposed cord-lock members are configured to flex toward one another as the cord insert is inserted into the channel of the main body to cause the opposed cord-lock members to securely clamp onto the portion of the cord.

2. The whistle assembly of claim 1, wherein at least outer portions of the cord-lock members are configured to securely connect the cord insert to interior surfaces of the main body that define at least a portion of the channel.

3. The whistle assembly of claim 1, wherein the locking stud comprises one or more cord-engagers.

4. The whistle assembly of claim 1, wherein the cord insert further comprises one or more locking protuberances extending outwardly therefrom, wherein the one or more locking protuberances are configured to securely connect the cord insert to interior surfaces of the main body that define at least a portion of the channel.

5. The whistle assembly of claim 1, wherein the cord insert further comprises one or more sealing members configured to sealingly engage interior surfaces of the main body.

6. A whistle assembly comprising:
a main body including a mouth-receiving end connected to a cord end, wherein the mouth-receiving end includes a blow hole connected to a whistle hole through a whistle passage, wherein a channel is formed through at least a portion of the cord end;
a cord insert including a housing having a cord passage and opposed cord-lock members, wherein each of the cord-lock members comprises a flexible root connected to a locking stud, wherein the locking stud inwardly flexes about the flexible root, wherein the cord insert is retained within the channel of the main body, and
a cord having an end that is securely retained within the cord passage of the cord insert that is within the channel of the main body, wherein the opposed cord-lock members securely clamp to the end of the cord within the cord passage, wherein the locking stud engages the end of the cord, wherein the locking stud inwardly deflects about the flexible root as the cord insert is inserted into the channel of the main body, and wherein the locking studs of the opposed cord-lock members flex toward one another as the cord insert is inserted into the channel of the main body causing the opposed cord-lock members to securely clamp onto the portion of the cord.

7. The whistle assembly of claim 6, wherein at least outer portions of the cord-lock members securely connect the cord insert to interior surfaces of the main body that define at least a portion of the channel.

8. The whistle assembly of claim 6, wherein the locking stud comprises one or more cord-engagers.

9. The whistle assembly of claim 6, wherein the cord insert further comprises one or more locking protuberances extending outwardly therefrom, wherein the one or more locking protuberances securely connect the cord insert to interior surfaces of the main body that define at least a portion of the channel.

10. The whistle assembly of claim 6, wherein the cord insert further comprises one or more sealing members that sealingly engage interior surfaces of the main body.

11. A whistle assembly comprising:
a main body including a mouth-receiving end connected to a cord end, wherein the mouth-receiving end includes a blow hole connected to a whistle hole through a whistle passage, and wherein a channel is formed through at least a portion of the cord end;
a cord insert including: (i) a housing having a cord passage, (ii) opposed cord-lock members, wherein each of the cord-lock members comprises a flexible root connected to a locking stud, wherein the locking stud inwardly flexes about the flexible root, and (iii) one or more locking protuberances extending outwardly from one or more walls of the cord insert, wherein the one or more locking protuberances securely connect the cord insert to interior surfaces of the main body that define at least a portion of the channel, wherein the cord insert is retained within the channel of the main body, and wherein at least outer portions of the cord-lock members securely connect the cord insert to interior surfaces of the main body that define at least a portion of the channel; and
a cord having an end that is securely retained within the cord passage of the cord insert that is within the channel of the main body, wherein that opposed cord-lock members securely clamp to the end of the cord within the cord passage, wherein the locking stud inwardly deflects about the flexible root as the cord insert is inserted into the channel of the main body, and wherein the locking studs of the opposed cord lock members flex toward one another as the cord insert is inserted into the channel of the main body causing the opposed cord lock members to securely clamp onto the portion of the cord.

12. The whistle assembly of claim 11, wherein the locking stud comprises one or more cord-engagers.

13. The whistle assembly of claim 11, wherein the cord insert further comprises one or more sealing members that sealingly engage interior surfaces of the main body.

* * * * *